Figure 1:
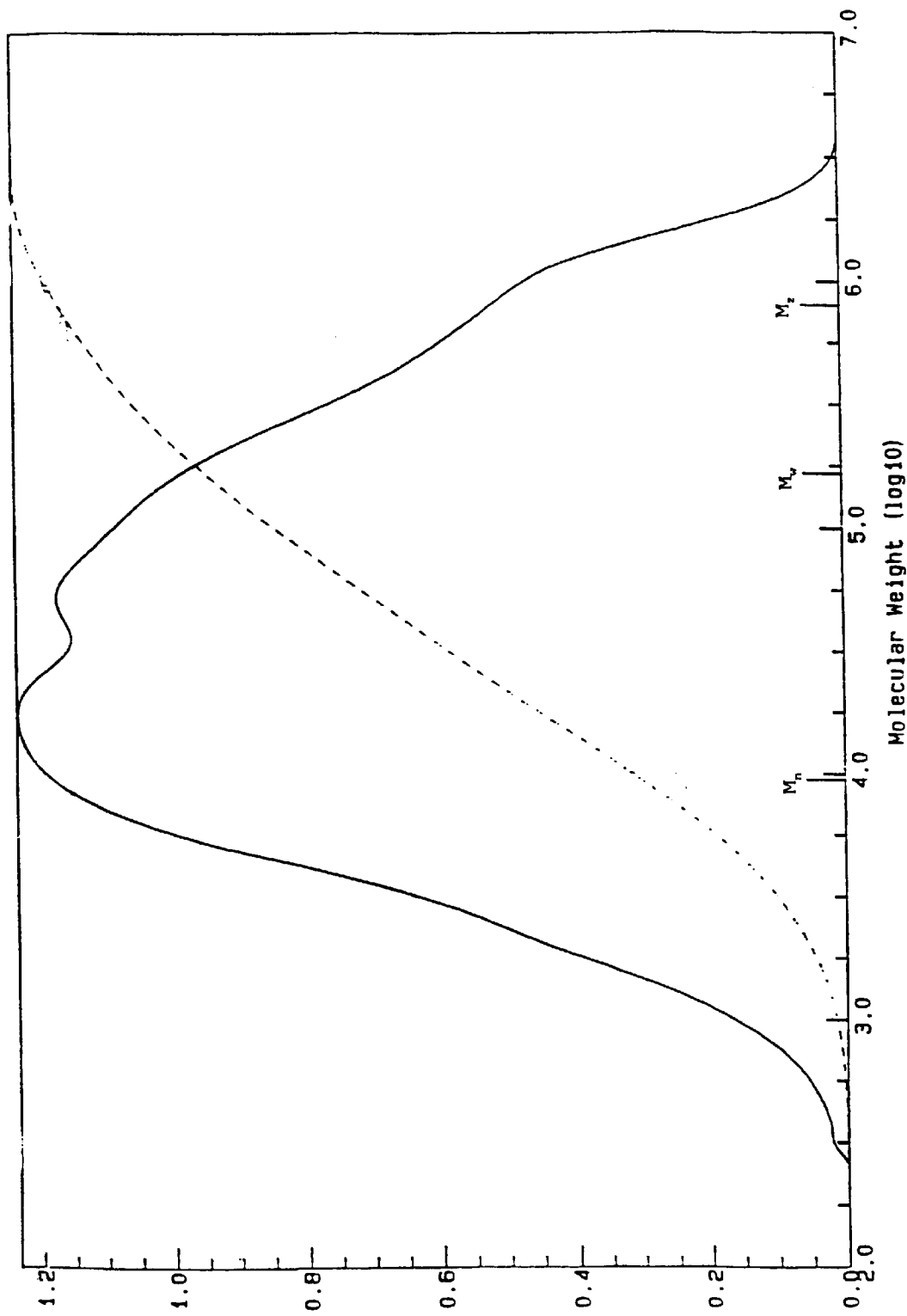

United States Patent [19]
Yeates et al.

[11] Patent Number: 6,121,364
[45] Date of Patent: Sep. 19, 2000

[54] BINDER RESIN, PROCESS FOR ITS MANUFACTURE AND COMPOSITION CONTAINING IT

[75] Inventors: Stephen George Yeates, Macclesfield; Anita Margaret De La Motte, Stockton, both of United Kingdom

[73] Assignee: Zeneca Limited, London, United Kingdom

[21] Appl. No.: 08/945,931

[22] PCT Filed: Apr. 24, 1996

[86] PCT No.: PCT/GB96/00980

§ 371 Date: Apr. 13, 1998

§ 102(e) Date: Apr. 13, 1998

[87] PCT Pub. No.: WO96/34018

PCT Pub. Date: Oct. 31, 1996

[30] Foreign Application Priority Data

Apr. 28, 1995 [GB] United Kingdom .................... 9508692

[51] Int. Cl.⁷ ..................................... C08C 19/22
[52] U.S. Cl. .......................... 524/458; 524/459; 524/460; 526/79; 526/80; 526/201; 526/202
[58] Field of Search .................... 524/458, 459, 524/460; 526/201, 202, 79, 88

[56] References Cited

U.S. PATENT DOCUMENTS

| | | | |
|---|---|---|---|
| 4,501,845 | 2/1985 | Baus et al. ............................... | 524/460 |
| 4,626,488 | 12/1986 | Inoue ...................................... | 430/109 |
| 5,371,151 | 12/1994 | Berge et al. ............................. | 525/377 |
| 5,391,631 | 2/1995 | Baus et al. ............................... | 525/303 |

FOREIGN PATENT DOCUMENTS

| | | |
|---|---|---|
| 354 466 | 2/1990 | European Pat. Off. . |
| 575 931 | 12/1993 | European Pat. Off. . |

*Primary Examiner*—Ana Woodward
*Attorney, Agent, or Firm*—Pillsbury Madison & Sutro LLP

[57] ABSTRACT

A polymeric material comprising at least first and second polymer parts, which first part has a number average molecular weight higher than that of the second part and which first and second polymer parts each comprise a respective polymer part derived from at least one ethylenically unsaturated monomer, is prepared by a process which comprises the steps of (1) preparing, by aqueous suspension polymerisation the first, higher molecular weight polymer part in the presence of a free radical initiator, but in the absence of a chain transfer agent to form a suspension of the first, higher molecular weight part and thereafter (2) preparing by aqueous suspension polymerisation the second, lower molecular weight part, which preparation step (2) is carried out in the presence of the suspension of the first, higher molecular weight part, a free radical initiator and a catalytic chain transfer agent (CCTA). Step (2) may be continued to provide, additionally, a third polymer of a molecular weight intermediate that of the first and second polymers. A polymeric material thus obtainable has a PDi of at least 5 and a skewed molecular weight distribution in which the first-third polymers are present in successively increasing amounts. The polymeric material is especially suitable for use as a binder in a toner composition.

16 Claims, 2 Drawing Sheets

BINDER RESIN, PROCESS FOR ITS MANUFACTURE AND COMPOSITION CONTAINING IT

This application is the national phase of international application PCT/GB96/00980, filed Apr. 24, 1996 which designated the U.S.

The present invention relates to a binder resin, a process for its manufacture and a composition containing it, especially a toner composition for dry development in an image forming process such as electrophotography, electrostatic recording or magnetic recording.

In electrophotography, there is, on the one hand, the need for achieving rapid fixation at as low a temperature as possible. To achieve this, it is necessary for the toner binder to have a relatively low molecular weight. On the other hand, the development process includes contact of the image bearing material with at least one roller, which should not inadvertently remove part of the toner composition due to such contact. In short, the toner must be capable of resisting offset in order to provide improved performance of the toner. In this regard, a relatively high molecular weight polymeric binder is suitable. In an attempt to provide a toner binder which satisfies both of the abovementioned requirements of rapid, low temperature fixing and at the same time resistance to offset, binder compositions having a broad molecular weight distribution, including respective high and low molecular weight polymers, have been employed; see, for example, U.S. Pat. No. 5,219,946.

Such mixtures of high and low molecular weight polymers may be prepared either by preparing a high molecular weight polymer in the presence of a low molecular weight prepolymer or preparing a low molecular weight polymer in the presence of a high molecular weight prepolymer. For example, U.S. Pat. No. 4,486,524 discloses a method of preparing a mixture of high and low molecular weight polymers by suspension polymerisation in which the high molecular weight polymer is first prepared by suspension polymerisation and, in the same polymerisation system, the low molecular weight polymer is then prepared, also by suspension polymerisation. Similarly, EP-A-0199859 discloses the suspension polymerisation of a low molecular weight polymer in the presence of a dispersing agent and in the presence of a prepolymer having a high molecular weight and obtained by emulsion polymerisation. EP-A-0354466 discloses a process for producing a toner resin by a two step suspension polymerisation process in which, firstly, a high molecular weight polymer is produced by suspension polymerisation using specifically an initiator having at least three t-butyl peroxide groups, then secondly, a low molecular weight polymer is prepared using a conventional free radical initiator. After preparation of the high molecular weight polymer, additional monomer, water, dispersing agent and chain transfer agent, for example, may be added if necessary.

In particular, currently, the view tends to be that polymers having a "skewed" molecular weight distribution provide the best toner binders; in particular, they allow the composition to behave as a rubber, i.e. have a tan δ approaching unity over a wider temperature range. Such "skewed" polymer compositions preferably contain a relatively large amount of a low molecular weight polymer, a somewhat lower proportion of a polymer of intermediate molecular weight and a small proportion of high molecular weight polymer. The respective molecular weight distribution peaks for each of these respective polymer parts may or may not overlap with one another.

Surprisingly, we have found that polymeric materials are obtainable, using catalytic chain transfer technology, which have a molecular weight distribution particularly suitable for binder resins, especially as toner binder resins for electrophotography but potentially useful for many other surface coating applications such as pressure sensitive adhesives.

Thus, according to a first aspect, the present invention provides a process for the preparation of a polymeric material, which polymeric material comprises at least first and second polymer parts, which first part has a number average molecular weight higher than that of the second part and which first and second polymer parts each comprise a respective polymer part (preferably a copolymer part) derived from at least one ethylenically unsaturated monomer which process comprises the steps of (1) preparing, by aqueous suspension polymerisation the first, higher molecular weight polymer part in the presence of a free radical initiator, but in the absence of a chain transfer agent to obtain a suspension of the first, higher molecular weight polymer part and thereafter (2) preparing by aqueous suspension polymerisation the second, lower molecular weight part, which preparation step (2) is carried out in the presence of the suspension of the first, higher molecular weight part, a free radical initiator and a catalytic chain transfer agent.

We find surprisingly that such a process may provide a particularly broad and controlled molecular weight distribution such that the polydispersity index PDi (Mw/Mn) measured by gel permeation chromatography (GPC) is at least 5, and may be at least 15. When the process is controlled such that the polymeric material contains a greater proportion, of the total weight of the polymeric material, of the second, lower molecular weight part than the first, higher molecular weight part, such polymeric materials provide particularly excellent toner binders.

We find it especially surprising that if, as in a preferred aspect of the invention, the reaction of step (2) above is allowed to continue, a step (3) takes place in which a third polymer part having a number average molecular weight intermediate those of the respective first and second parts is formed.

It is not certain which mechanism operates or predominates during step (3). For example, formation of the polymer of intermediate molecular weight may be caused by grafting of further monomer onto the low molecular weight polymer.

Steps (1)–(3) may be carried out for various respective time intervals for which the reactions are carried out and/or with various proportions of monomer used (in relation to total monomer of the polymeric material) in order to adjust both the molecular weight distribution as desired and the ratio of the proportions of polymer parts prepared by respective steps (1)–(3).

The molecular weight distribution, after step (3), may be such as to provide a "trimodal" polymeric material in which a graph showing the proportional amounts of a polymer having a particular molecular weight shows three distinct peaks. Alternatively, the graph may merely show a broad continuum of molecular weights with perhaps only one or two peaks or shoulders.

In reaction steps (1)–(3), the respective reaction times and proportion of total monomer for the polymeric material may be adjusted so that the respective proportions of the second lower molecular weight polymer, the third, intermediate molecular weight polymer and the first, higher molecular weight polymer are in successively decreasing or increasing order. Such a molecular weight distribution is hereinafter referred to as "skewed" (and the relevant polymer material as a "skewed polymer").

Alternatively, the process can be controlled so that the proportion of the polymer part of intermediate molecular weight is either less than or greater than each of the respective portions of the lower and higher molecular weight polymer parts.

However, in particular, using a process embodying the invention, especially if it includes step (3), a skewed polymer having a particularly broad number average molecular weight distribution may be obtained.

Thus, according to a second aspect, the invention provides a polymeric material comprising at least a first, higher molecular weight part, a second, low molecular weight part and a third, intermediate molecular weight part such that the respective second, third and first parts have successively increasing number average molecular weights and the respective first, third and second parts are present in successively increasing or decreasing proportional amounts, by weight of the polymeric material, the polymeric material having a molecular weight distribution such as to have a polydispersity index, PDi (Mw/Mn) of at least 5, preferably at least 10 and more preferably at least 15.

Polymeric materials in which the number average molecular weight distribution is such that the first, third and second polymer parts are present in successively increasing proportional amounts may provide particularly excellent toner binders.

Thus, according to a third aspect, the invention provides a toner composition comprising a pigment and a binder of polymeric material comprising at least a first, higher molecular weight part, a second, low molecular weight part and a third, intermediate molecular weight part such that the respective second, third and first parts have successively increasing number average molecular weights and the respective first, third and second parts are present in successively increasing proportional amounts, by weight of the polymeric material, the polymeric material having a PDi of at least 5, preferably at least 10 and more preferably at least 15.

The toner binder may be prepared by conducting a polymerisation process of the invention in the presence of a pigment and/or dye.

In a process in accordance with the invention, the various reaction steps (1)–(3) may be carried out by adopting either of the following procedures, namely:

1(a) allow the total content x of monomer to be present when commencing the reaction to form the first, high molecular weight polymer and allow a conversion of monomer to, say y % (y<x), thereafter (b) add a CCTA, continue to allow reaction of the remaining part of monomer content x to form the second, low molecular weight part and (c) continue the reaction in the presence of the CCTA so as to provide the third, intermediate molecular weight part in a proportional amount between the larger amount of the second, low molecular weight part and the smaller amount of the first, high molecular weight part.

2(a) allow only a proportion, e.g. x/2, of the total monomer content x to be present and polymerise this proportional amount to 100% conversion, (b) add the remaining monomer and a CCTA dissolved in the monomer, (c) allow polymerisation of the second, low molecular weight part and (d) continue the reaction conversion so as to provide the third part of a molecular weight intermediate that of the first, higher molecular weight and second low molecular weight parts, in a proportion larger than that of the first, high molecular weight part but smaller than that of the second, low molecular weight part.

In alternative 2, only that monomer required to obtain the high molecular weight polymer part is present when preparing the small amount required of the high molecular weight polymer. This allows for greater control of the process and may be preferred.

For either alternative, by varying the phase ratio of low and high molecular weight phases and by varying the percentage conversion of the first formed polymer at which the second phase is added, the desired molecular weight control may be achieved.

In particular, the amount of CCTA present governs the minimum molecular weight of the polymer mixture, while the amount of initiator governs the maximum molecular weight.

Although the above alternatives 1 and 2 are described with reference to a 3-step process, it can be seen that the variation between these alternatives arises in steps (1)–(2), so that either alternative may be employed without step (3) so as to provide a polymer having a bimodal distribution.

Moreover, in general, steps (b) and (c) of alternative 1 (and indeed steps (c) and (d) of alternative 2) are not discrete steps; they may overlap with one another. However, the intermediate molecular weight polymer part tends to be formed subsequently to the formation of at least a substantial part of the lower molecular weight polymer part.

As acknowledged above, EP-A-0354466 suggests that during the preparation of a low molecular weight polymer in the presence of a high molecular weight polymer, a chain transfer agent may be added. However, the use of such chain transfer agents (as opposed to a CCTA) may provide only a "bimodal" composition where the polymer mixture contains only respective high and low molecular weight fractions. We find surprisingly that, when using a CCTA, especially a CCTA having a high solubility in monomer but a low solubility in water, it may also be possible to obtain such bimodal compositions where desired, but using considerably lower amounts of chain transfer agent than when using a conventional chain transfer agent. More importantly, it is often desirable to obtain a polymer composition in which the molecular weight distribution is "skewed" as described above, whereby the composition contains, for example, a smaller amount of a first, large molecular weight polymer part, a rather larger amount of a third, intermediate molecular weight polymer part and a still larger amount of a second, low molecular weight polymer part. We find surprisingly that certain CCTAs, especially under certain conditions, may provide such a skewed composition having an extremely broad molecular weight distribution as represented by PDi.

Thus, as explained above, in order to achieve the skewed molecular weight distribution, in general, the composition is preferably prepared by obtaining firstly the high molecular weight polymer and thereafter the low and medium molecular weight polymers ("high-low"). Thus, using catalytic chain transfer technology in the manner described above, it would not usually be possible to obtain firstly the low molecular weight polymer and thereafter the high ("low-high") because the chain transfer agent would inhibit the subsequent production of a high molecular weight product. However, such difficulties may be overcome if the low molecular weight polymer is firstly prepared in the presence of a CCTA and an initiator which does not adversely affect it, for example, an azo initiator (which is preferred and of which 2,2'-azo-bis-isobutyronitrile (AIBN) and 2,2'-azo-bis-2,4-dimethyl valeronitrile are especially preferred) and thereafter the high molecular weight polymer is prepared either after removal of the CCTA, or after rendering the CCTA inactive or in conditions under which the CCTA is rendered inactive, for example, in the presence of an initiator capable of rendering inactive the CCTA. In particular, an oxidising initiator selected, for example, from certain peroxides, e.g. hydrogen peroxide, capable of reaction with the CCTA, may be employed.

Nevertheless, the "high-low" technique previously described is preferred. In one such especially preferred process for preparing the composition, polymerisation of the monomer forming the high molecular weight polymer is continued until the "hard bead" state is reached, at which stage the monomer for preparing the low molecular weight polymer, including the CCTA is added and the polymerisation continued to completion.

In a polymeric material for use as a toner binder, the preferred minimum number average molecular weight in the window is 500–20,000 and preferred is 1,000–10,000. More preferably, rather than individual peaks, the window preferably contains an amount of polymer throughout the entire range of molecular weights so as to provide respective peaks and troughs.

Preferably, the composition comprises a first, high molecular weight part having a number average molecular weight of at least 100,000, more preferably at least 125,000 and present in a proportional amount of 5–70%, more preferably 20–50%, by weight of the total mixture and a second low molecular weight part having a number average molecular weight of no more than 20,000, more preferably no more than 10,000 and present in a proportional amount of at least 20%, more preferably at least 30%. It is also preferred that the composition exhibits respective peaks or shoulders for each of the respective high and low molecular weight, as in a so-called "bimodal" composition. However, it is especially preferred that the composition additionally comprises a third polymer part of intermediate molecular weight having a number average molecular weight between those of the high and low molecular weight polymers, and present in an amount of from 10% to 40% by weight of the total weight of the composition.

As previously explained, in order for the polymer composition to be effective as a toner, it is desired that it has the correct viscoelastic profile. Thus, if the material is too "glassy" at low temperature then there is poor low temperature flow and if it is too fluid at high temperature, then there is poor block and hold out. Ideally, it is required that in a dynamic experiment, tan $\delta=1$ i.e. the characteristic of a rubber.

Additionally, the polymer composition should have a glass transition temperature (Tg) of from 40 to 80° C., preferably 45 to 65° C.; if Tg <40° C., then blocking of the toner powder on storage may occur, whereas if Tg >80° C., then high fixing temperatures are required.

The monomers may be any capable of free radical polymerization, and preferred as at least the major component of a monomer source is a monomer capable of providing a hydrophobic polymer. For example, for the high molecular weight polymer fraction, a styrene rich (up to about 80 wt %) copolymer having the desired Tg, especially an styrene/butyl acrylate or styrene/butyl methacrylate copolymer, may be preferred, while for the low and intermediate fractions, a methacrylate rich copolymer for example, a methyl methacrylate/butyl methacrylate copolymer, is preferred, in order that the CCTA be most effective; although low levels of styrene or acrylate can be included, for example, as in the preferred methyl methacrylate/styrene copolymer, these reduce the efficiency of the CCTA.

In particular, methacrylate monomers or comonomers may be preferred as the major monomer component for each of the low and high molecular weight polymers. Particularly preferred monomers as the major monomer component are methyl methacrylate, ethyl methacrylate, propyl methacrylate, butyl methacrylate, especially isobutyl methacrylate, octyl methacrylate, steryl methacrylate and glycidyl methacrylate. Such monomers, where not present as a major component, are also preferred as a minor monomer component. Additional vinyl monomers preferred as a minor monomer component are acrylic acid esters such as methyl acrylate, ethyl acrylate, propyl acrylate, butyl acrylate, especially isobutyl acrylate, 2-ethylhexyl acrylate, octyl acrylate, aromatic vinyl monomers such as styrene, α-methyl styrene and chlorostyrene and α, β-unsaturated carboxylic acids such as acrylic acid and methacrylic acid. Additional, crosslinking, poly α, β-ethylenically unsaturated monomers may also be present, for example as given in U.S. Pat. No. 5,214,949, and especially divinyl benzene.

When the above polymers are copolymers containing aromatic vinyl monomers such as styrene or acid functional monomers such as acrylic acid, the level of such monomers in the low molecular weight polymer must be such as not to effect adversely, to any significant extent, the efficiency of the catalytic chain transfer agent, and is preferably $\leq50$ wt %, more preferably $\leq30$ wt %.

The particle size of the polymers is preferably in the range 1–500 μm.

The suspension polymerisation process may be carried out for example as described in U.S. Pat. No. 5,219,946 and EP-A-0354466.

In particular, for preparation of the high molecular weight polymer, the comonomers are suspended in water with the assistance of a suspension agent generally employed in suspension polymerisation for the polymerisation of olefinically unsaturated monomers in aqueous suspension. The suspension agent may be any one or more of, for example, protective colloids such as partially hydrolysed polyvinyl acetate (various degrees of hydrolysis), gelatin, polyvinyl pyrrolidone, polyacrylic acid (especially preferred), and cellulose derivatives, e.g. methyl cellulose, carboxy methyl cellulose and hydroxy ethyl cellulose. The suspension agent may be present in a conventional quantity, generally from 0.01 to 8% by weight (preferably 0.01 to 6%), calculated on total monomer weight to be present in all reaction stages.

The polymerisation is carried out in the presence of an initiator which may be any free radical yielding monomer soluble initiator, or combination thereof, especially peroxy compounds such as di-tertiary butyl peroxide, acyl peroxides such as lauroyl peroxides, benzoyl peroxide and dibenzoyl peroxide, acetylcyclohexyl sulphonyl peroxide, peresters such as tertiary butyl peroctoate, percarbonates and azo compounds such as 2,2'-azo-bis-iso-butyronitrile (AIBN) and 2,2'-azo-bis-2,4-dimethyl valeronitrile. Azo initiators, especially AIBN, are preferred. The initiator(s) may be used in a conventional quantity, generally from 0.05 to 10% by weight (and preferably 0.1 to 6%) calculated on monomer weight for the reaction stage producing the high molecular weight monomer.

For polymerisation of the lower molecular weight polymers, the CCTA is additionally present. This may be selected so that it has the appropriate solubility and reactivity characteristics for suspension polymerization. Indeed, in general, the greater the solubility of the CCTA in monomer and the lower its solubility in water, the more effective is the CCTA. More preferred CCTAs are cobalt chelates, such as those disclosed in, for example, EP-A-0249614, U.S. Pat. No. 4,680,352, U.S. Pat. No. 4,694,054 and U.S. Pat. No. 4,722,984. Especially preferred CCTAs are CoII chelates of the following formula

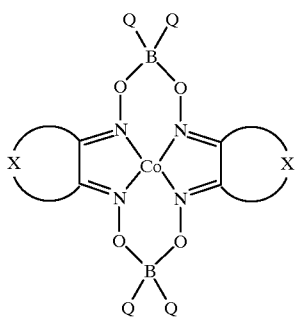

wherein X is a divalent group which forms with the two carbon atoms to which it is bonded a pericondensed polycyclic group, preferably having at least one aromatic ring, and which is unsubstituted or has at least one hydrocarbyl substituent, and wherein each group Q is independently selected from F, Cl, Br, OH, $C_{1-12}$ alkoxy, aryloxy (preferably $C_{6-10}$ aryloxy), $C_{1-12}$ alkyl and aryl (preferably $C_{6-10}$ aryl); or being a CoIII analogue of the CoII chelate of formula (I) in which the Co atom is additionally covalently bonded, in a direction at right angles to the macrocyclic chelate ring system, to H, a halide or other anion, or a homolytically dissociable organic group. Examples of such chelates are cobalt (1,2-diphenyl-1,2-dioxyiminoethane-$BF_2)_2$ (CoPhBf), optionally coordinated to bases such as pyridine or amines or, for example, to compounds capable of serving as bases, such as water or methanol.

The CCTA is preferably present in an amount of from 10 to 1000, more preferably 25–400, especially 30–300, ppm by weight of monomer for the low molecular weight fraction. In particular, the larger the amount of styrene or acrylate monomer present as compared with methacrylate monomer, the more CCTA is required.

For the low molecular weight polymerisation process, although any suitable free radical yielding initiator may be used, as described above with reference to the high molecular weight polymer, the usual criteria being that it has suitable monomer solubility and is sufficiently active at the polymerisation temperature (usually having a half-life in the range 0.5 to 5 hours), there is the additional proviso for such low molecular weight polymer production that the initiator does not unacceptably affect the stability of the cobalt chelate.

However, both the nature and amount of initiator present may be somewhat different from that for the polymerisation of the high molecular weight polymer. For example, with reference to the amount, a minimum amount of 0.1 wt % and a maximum amount of 3, more preferably 2, and especially preferably 1, wt %, calculated on monomer weight for the low and (when present) intermediate molecular weight polymer may be present.

In a method embodying the invention in which the total monomer for each of the high and low molecular weight fractions is present in the initial reaction mixture, all initiator for all reaction stages may also be present initially. Alternatively, sufficient initiator may be present initially to conduct the first reaction stage producing the high molecular weight fraction with further initiator being added with the CCTA at commencement of the second reaction stage for producing the low molecular weight fraction.

In a method in which a first portion of monomer is polymerized to prepare the high molecular weight fraction in a first reaction stage and a second portion of monomer is later added with the CCTA to prepare the lower molecular weight fraction in a second reaction stage it is preferred that the initiator for the second reaction stage is added with the CCTA and second portion of monomer.

The particle size of the final polymer particles, preferably in the range 1–500 μm can be controlled by the type and level of suspending agent present throughout the process, as well as the agitation conditions employed. When small particle sizes within the above range are desired, it may be preferable to homogenise the monomers in the presence of the suspending agent prior to polymerisation.

Usually, the final product produced by the suspension polymerisation process described above is harvested by centrifugation or filtration, followed by washing and drying.

Although as mentioned above any catalytic chain transfer agent may be employed, we find it especially surprising that if certain Co chelates are employed as CCTAs, then the molecular weight distribution may be of the skewed type especially suitable for electrographic toner binders.

Particular advantages associated with the process of the invention as compared with existing technologies include:
(1) The process is solvent free both for the synthesis of the low and high molecular weight fractions; thus, there is no solvent stripping required nor entrainment of solvent in the final product.
(2) Improved mixing of low and high molecular weight phases can be achieved; the low and high molecular weight phases may be a continuum of molecular weight distributions, as in the "skewed" type, rather than discrete phases.
(3) There is a potential for grafting so as to provide an intermediate phase between low and high molecular weight phases.
(4) As a result of (2) and (3), better compatibility between the phases is likely.

Embodiments of the invention will now be described in more detail with reference to the following Examples.

In the Examples, the molecular weight distribution was measured by gel permeation chromatography (GPC), calibrated against polystyrene (PS) standards. Quoted values are therefore defined in terms of the equivalent polystyrene molecular weight.

The indication "High:Low" means that the high molecular weight polymer was produced prior to the low molecular weight polymer, while "Low:High" means the reverse.

Initials are as follows:
MMA—methyl methacrylate
BMA—n-butyl methacrylate
AIBN—2,2'-azo-bis-iso-butyronitrile
BPO—dibenzoyl peroxide
CoPhBf—cobalt(1,2-diphenyl-1,2-dioxyiminoethane-$BF_2)_2$
DCT—dodecane thiol
Mn—number average molecular weight
Mw—weight average molecular weight
Mz—z-average molecular weight
PDi—polydispersity index (Mw/Mn).

The proportions of components used in Examples 1–8 and the GPC results obtained are shown in Table 1, in which wt % values are on total monomer for all stages. A graphical representation is included for Example 1 (FIG. 1).

EXAMPLE 1

High/Low

To a 1 litre nitrogen blanketed roundbottom flask fitted with an agitator and condenser was charged 400 g distilled water, 0.6 g Na$_2$SO$_4$ and 2.4 g of a polyacrylic acid stabiliser (25% w/w in water). The contents were heated to 75° C. with agitation. Stage 1 monomers were then added, namely: 19.3 g BMA and 30.7 g MMA dissolved in which was 0.125 g AIBN. The reaction was allowed to proceed at 75° C. for 3 hours at which time "hard beads" could be observed in the reaction flask. The polymer was sampled at this time and the molecular weight was determined as being Mn=85750; Mw=180075; PDi=2.1. The Stage 2 monomers were then charged, namely: 19.3 g BMA and 30.7 g MMA, in which were dissolved 0.25 g AIBN and 0.018 g CoPhBf. The reaction was then continued at 75° C. for a further 3 hours at which time the reactor was cooled to 30° C. and the solid beads harvested. The beads were then washed and dried under nitrogen at 40° C.

This molecular weight distribution was then measured and is shown graphically in FIG. 1, in which:

the full line represents the distribution of weight fractions;

the dotted line represents the cumulative weight distribution.

The GPC was obtained by adsorption of the polymer from a dilute solution of the polymer in tetrahydrofuran (THF) followed by elution of the polymer. The first fraction was eluted after 15.62 mins and the last after 29.20 mins. The abscissa represents the refractive indices of the various fractions, calibrated against polystyrene. All molecular weights are quoted as polystyrene equivalents ($\log_{10}$).

From these graphs, the following results can be read:

Weight average molecular weight, Mw=165300 ($\log_{10}$=5.2183)

Number average molecular weight, Mn=9398 ($\log_{10}$=3.9731)

Peak molecular weight, Mp=16670 ($\log_{10}$=4.2222) PDi=17.58

Fraction having a molecular weight of $\leq$10,000 ($\log_{10}$4)=35% (see cumulative weight graph).

EXAMPLE 2

High/Low

A polymer composition was prepared in the same manner as described in Example 1, except for the change of proportions of MMA, BMA, AIBN and CoPhBf shown in Table 1.

EXAMPLE 3

High/Low

The first stage polymerisation process was carried out exactly in accordance with that of Example 2, but the second stage was commenced at the earlier times of 0.5 hours (Example 3a), 1 hour (Example 3b) and 1.5 hours (Example 3c). A larger quantity of CCTA was also employed.

EXAMPLE 4

High/Low

A polymer composition was prepared exactly in accordance with Example 1, except that the proportions of MMA/BMA were as in Example 2.

EXAMPLE 5

High/Low

This was carried out in accordance with Example 2 except that, (i) the AIBN (0.125 wt %) was replaced by BPO (1.4 wt %) in stage 1, (ii) 0.06 wt % of CoPhBf was added at the second stage, (iii) the high:low proportion of monomer was changed to 30:70 and (iv) the second stage monomer was charged after only 1 hour.

EXAMPLE 6

Low/High

A polymer composition was prepared exactly in accordance with Example 1, except that the reaction of Stage 2 of Example 1 was carried out before the reaction of Stage 1.

EXAMPLE 7

Low/High

A polymer composition was prepared exactly in accordance with Example 2, except that, again, the reaction of Stage 2 of Example 2 was carried out before that of Stage 1.

EXAMPLE 8

The rheological properties of the polymer of Example 1 were compared with those of Almacryl B1500, a commercial styrene/acrylic bimodal copolymer for toners, for which copolymer Mw=230,780, Mn=4028, Mp=5122 and PDi=57.

The rheological data, in particular, variation of each of melt viscosity and tan $\delta$ with temperature, was obtained using a Rheometrics RDS II Configuration Parallel Plate Viscometer, with a gap of 2.5 cm between the parallel plates, operating at a frequency of 1 Hz, a strain of 10% and a heating rate of 10° C./min. The results are represented graphically in FIG. 2, in which the rheometric profile is shown by graphs which represent the following respective relationships:

Full circles—melt viscosity (Pa.s) vs temperature (° C.) for the polymer of Example 1

Empty circles—melt viscosity (Pa.s) vs temperature (° C.) for Almacryl B1500

Empty line—tan $\delta$ vs temperature (° C.) for the polymer of Example 1

Full line—tan $\delta$ vs temperature (° C.) for Almacryl B1500.

In these graphs, tan $\delta$ is the ratio of loss modulus ($G^{11}$) to the storage modulus ($G^1$):tan $\delta = G^{11}/G^1$. This dimensionless value represents the ratio of the energy loss (dissipated as heat) per cycle to the energy stored per cycle, and hence recovery per cycle. When tan $\delta \ll 1$, the material behaves as a solid or glass and when tan $\delta \gg 1$, it behaves as a liquid. When tan $\delta = 1$, the material behaves as a rubber.

For a toner binder, it is desired that the polymer should behave as a rubber over as wide a temperature range as possible.

Figure 2:
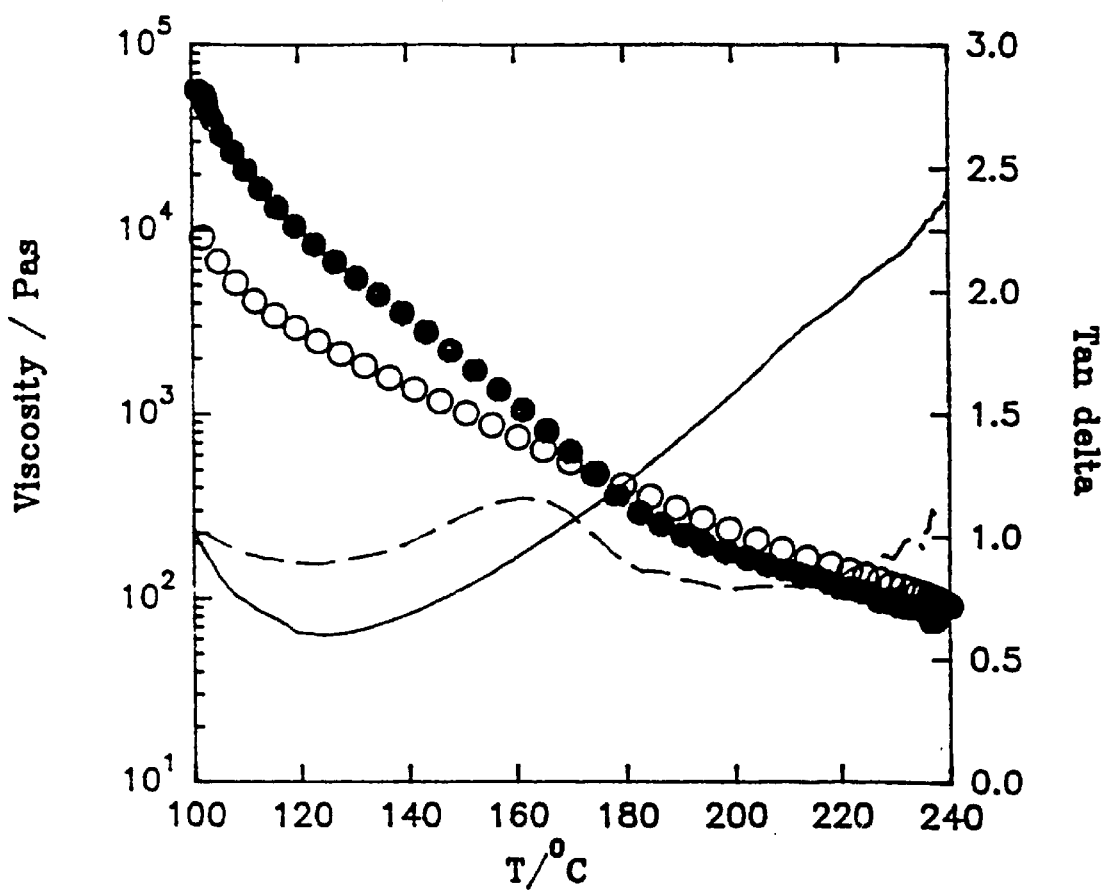

FIG. 2 shows that the polymer of Example 1 satisfied the requirement of tan $\delta = 1$ over a much wider temperature range (100–240° C.) as compared with the much narrower temperature range (100–180° C.) for the commercial product.

A comparison of the results achieved with Examples 1 and 2 with those of Examples 6 and 7 respectively shows that the high/low method of Examples 1 and 2 gives a very broad, skewed molecular weight distribution, whereas the low/high methods of Examples 6 and 7 gave only a monomodal distribution towards the low molecular weight.

Example 3 showed that if the addition of the monomer charge for preparing the low molecular weight polymer was carried out too soon after initiation of the first stage for providing the polymer of high molecular weight, then only a monomodal distribution was achieved with very little high molecular weight function; see Example 3(a). However, the longer the addition of the monomer charge for providing the low molecular weight polymer is held back, i.e. the higher the degree of conversion to the high molecular weight polymer then the broader the molecular weight distribution. In particular, it is preferred that hard beads of high molecular weight polymer are obtained prior to commencement of the low molecular weight polymer production stage.

Example 5 shows that even if the azo initiator AIBN is replaced by an oxidising initiator, BPO, present at a larger quantity, it is still possible to obtain a broad distribution. It would seem that the initiator in stage 1 did not unduly affect the catalytic activity of the CCTA.

Examples 6 and 7 are comparative, and have a PDi <15.

It can be seen from the above that a skewed molecular weight distribution of the polymer composition, ideal for electrographic toner binders, can be achieved by the method of the invention.

TABLE 1

CCT POLYMERS USING CoPhBf

| Example | Stage (*) | MONOMER COMPOSITION | | | ADDITION | [AIBN] | [BPO] | [CoPhBf] |
|---|---|---|---|---|---|---|---|---|
| | | MMA | BMA | HIGH:LOW | TIME STAGE2 | wt-% | wt-% | wt-% |
| EXAMPLE OF HIGH THEN LOW | | | | | | | | |
| 1 | 1 | 61.4 | 38.6 | 100:0 | | 0.25 | — | — |
| | 2 | | | 50:50 | 3 hrs | 0.5 | — | 0.036 |
| 2 | 1 | 40 | 60 | 100:0 | | 0.125 | — | — |
| | 2 | | | 50:50 | 3 hrs | 0.5 | — | 0.01 |
| 3 | 1 | 40 | 60 | 100:0 | | 0.125 | — | — |
| (a) | 2 | | | 50:50 | 0.5 hrs | 0.5 | — | 0.024 |
| (b) | 2 | | | 50:50 | 1 hrs | 0.5 | — | 0.024 |
| (c) | 2 | | | 50:50 | 1.5 hrs | 0.5 | — | 0.024 |
| 4 | 1 | 40 | 60 | 100:0 | | 0.25 | — | — |
| | 2 | | | 50:50 | 3 hrs | 0.5 | — | 0.036 |
| 5 | 1 | 40 | 60 | 100:0 | | — | 1.4 | — |
| | 2 | | | 30:70 | 1 hrs | 0.5 | — | 60 |
| EXAMPLE OF LOW THEN HIGH | | | | | | | | |
| 6 | 1 | 61.4 | 38.6 | 0:100 | | 0.5 | — | 0.036 |
| | 2 | | | 50:50 | 3 hrs | 0.25 | — | — |
| 7 | 1 | 40 | 60 | 0:100 | | 0.5 | — | 0.01 — |
| | 2 | | | 50:50 | 3 hrs | 0.125 | — | |

| | | | GPC RESULTS (PS equivalents) | | | | |
|---|---|---|---|---|---|---|---|
| Example | Stage (*) | DCT | Mn | Mw | Mz | PDi(w) Mw/Mn | PDi(z) Mz/Mn | COMMENT |
| 1 | 1 | | 85750 | 180075 | | 2.1 | | |
| | 2 | | 9398 | 165300 | 797200 | 17.6 | 84.8 | SKEWED |
| 2 | 1 | | 245600 | 761360 | | 3.1 | | |
| | 2 | | 27700 | 574200 | 1175000 | 20.7 | 42.4 | SKEWED |
| 3 | 1 | | | | | | | |
| (a) | 2 | | 34450 | 75790 | 139700 | 2.2 | 4.05 | MONOMODAL |
| (b) | 2 | | 49090 | 469800 | 1032000 | 9.5 | 21 | SHOULDER |
| (c) | 2 | | 26440 | 544664 | 1262000 | 20.6 | 47.7 | BIMODAL |
| 4 | 1 | | | | | | | |
| | 2 | | 34620 | 171200 | 1264000 | 12.96 | 36.5 | SKEWED |
| 5 | 1 | | | | | | | |
| | 2 | | 16020 | 254200 | 804100 | 15.9 | 50.1 | SKEWED |
| 6 | 1 | | 4624 | 10173 | | 2.2 | | |
| | 2 | | 7502 | 16504 | 28510 | 2.2 | 3.8 | MONOMODAL |
| 7 | 1 | | 15990 | 77180 | | 4.7 | | |
| | 2 | | 30270 | 86650 | 194500 | 2.9 | 6.4 | MONOMODAL |

What is claimed is:

1. A process for the preparation of a polymeric material, which polymeric material comprises at least first and second polymer parts, which first part has a number average molecular weight higher than that of the second part and which first and second polymer parts each comprise a respective polymer part derived from at least one ethylenically unsaturated monomer, which process comprises the steps of (1) preparing, by aqueous suspension polymerisation the first, higher molecular weight polymer part in the presence of a free radical initiator, but in the absence of a chain transfer agent to form a suspension of the first, higher molecular weight part and thereafter (2) preparing by aqueous suspension polymerisation the second, lower molecular weight part, which preparation step (2) is carried out in the presence of the suspension of the first, higher molecular weight part, a free radical initiator and a catalytic chain transfer agent (CCTA).

2. The process according to claim 1, wherein, in each of the steps (1) and (2), the respective proportions, by weight of total monomer used in the process, of monomers, and the respective time intervals for which each of steps (1) and (2) are carried out are controlled such that, in the final polymeric material produced by the process, the proportion of the second, lower molecular weight polymer is greater than the proportion of higher molecular weight polymer.

3. The process according to claim 1 or claim 2, which comprises the additional step of allowing the reaction of step (2) to continue for a period of time sufficient to perform a step (3) in which an additional, third polymer part having a number average molecular weight intermediate those of the first and second polymer parts is formed.

4. The process according to claim 3, wherein the step (3) is carried out for a time interval sufficient to allow the formation of a proportional amount, by weight of total monomer, of the third polymer part between the respective proportional amounts of the first and second polymer parts.

5. The process according to claim 1, wherein, in step (1), a proportion of the total monomer content of the polymeric material is subjected to aqueous suspension polymerisation to obtain a suspension of the first polymer part having a number average molecular weight higher than that of the second part and, in step (2) the remaining proportion of the total monomer content of the polymeric material and the catalytic chain transfer agent are added to the suspension of the said first polymer part obtained in step (1) and the said remaining proportion of the total monomer is subjected to aqueous suspension polymerisation.

6. The process according to claim 1, wherein, in step (1), a suspension of the total monomer content of the polymeric material is subjected to aqueous suspension polymerisation but for a time sufficient to allow polymerisation of only a proportion of the total monomer content to form a suspension containing the first polymer part having a number average molecular weight higher than that of the second part and additionally containing residual monomer and, in step (2), the catalytic chain transfer agent is added and the residual monomer is subjected to aqueous suspension polymerisation.

7. The process according to claim 1, wherein each step is carried out in the presence of a suspending agent present in an amount of from 0.01 to 8% by weight based on the weight of total monomer.

8. The process according to claim 1, wherein, in step (1), the initiator is selected independently of the initiator in step (2) and the initiator in each step is an azo compound.

9. The process according to claim 1, wherein, in step (1), the initiator is present in an amount of 0.05 to 10% by weight based on the weight of the monomer present prior to initiation of step (1).

10. The process according to claim 1, wherein, in step (2), the initiator is present in an amount of 0.1 to 3% by weight based on the weight of the monomer present prior to initiation of step (2).

11. The process according to claim 1, wherein the catalytic chain transfer agent used in step (2) is a CoII chelate of the formula

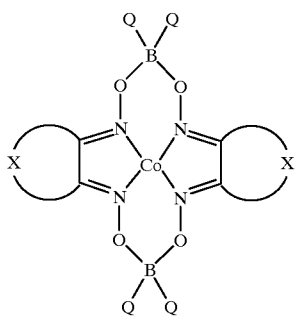

I wherein X is a divalent group which forms with the two carbon atoms to which it is bonded a pericondensed polycyclic group, and which is unsubstituted or has at least one hydrocarbyl substituent, and wherein each group Q is independently selected from F, Cl, Br, OH, $C_{1-12}$ alkoxy, aryloxy, $C_{1-12}$ alkyl and aryl; or is a CoIII analogue of the CoII chelate of formula (I) in which the Co atom is additionally covalently bonded, in a direction at right angles to the macrocyclic chelate ring system, to H, a halide or other anion, or a homolytically dissociable organic group.

12. The process according to claim 11, wherein the CoII chelate is cobalt (1,2-diphenyl-1,2-dioxyiminoethane-$BF_2$)$_2$ (CoPhBf), optionally coordinated to a base or to a compound capable of serving as base.

13. The process according to claim 1, wherein the polymeric material is a copolymer derived from methyl methacrylate and n-butyl methacrylate.

14. A process for the preparation of a polymeric material, which polymeric material comprises at least first and second polymer parts, which first part has a number average molecular weight higher than that of the second part and which first and second parts each comprise a respective polymer part derived from at least one ethylenically unsaturated monomer, which process comprises the steps of (1) preparing by aqueous suspension polymerisation, in the presence of a free radical initiator and a catalytic chain transfer agent (CCTA), the second polymer part and (2) preparing by aqueous suspension polymerisation the first higher molecular weight polymer part, which preparation step (2) is carried out in the presence of said second polymer part without separating out the CCTA, but either after rendering the CCTA inactive or under conditions in which the CCTA is rendered ineffective, whereby the first, higher molecular weight polymer part is obtained.

15. The process according to claim 14, wherein the low molecular weight polymer is prepared in the presence of an azo initiator.

16. The process according to claims 14 or 15, wherein the high molecular weight polymer is prepared in the presence of an oxidising initiator capable of reaction with the catalytic chain transfer agent to render the catalytic chain transfer agent ineffective.

* * * * *